(No Model.) 2 Sheets—Sheet 1.
L. GUTMANN.
ALTERNATING ELECTRIC MOTOR.
No. 530,177. Patented Dec. 4, 1894.
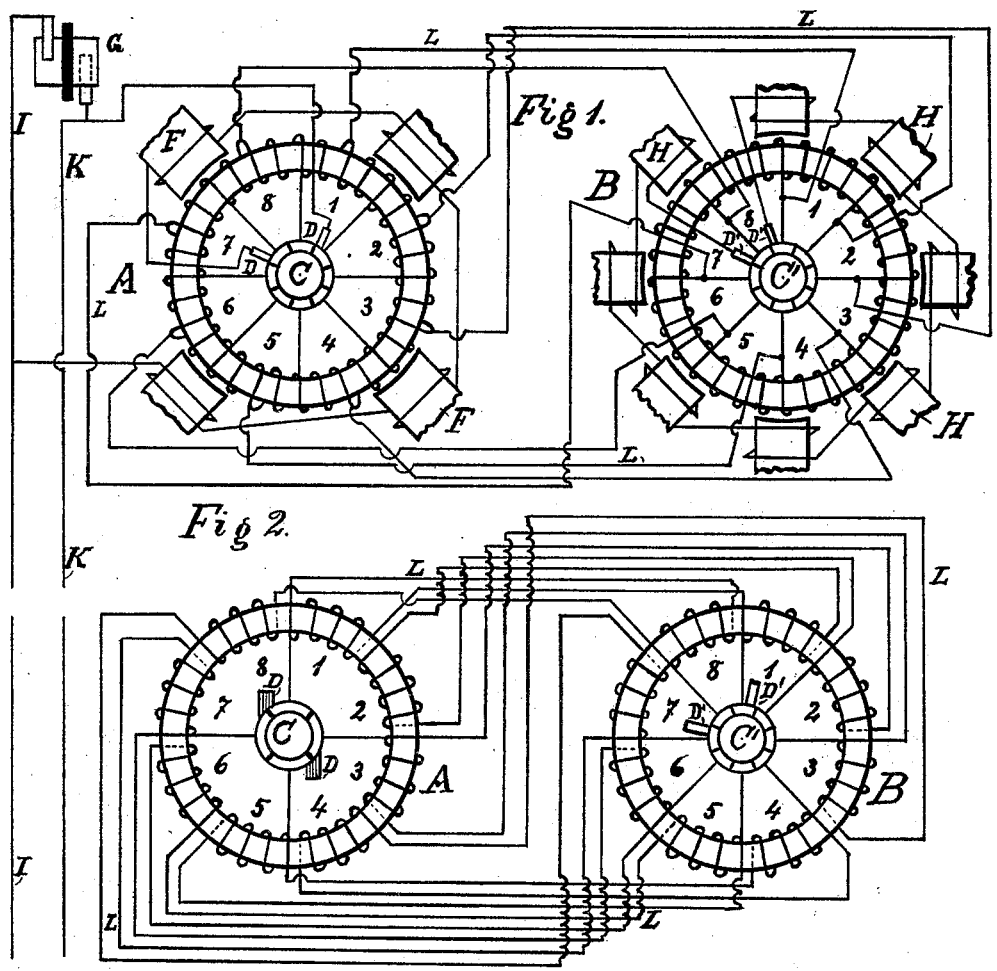
Witnesses:
Inventor:
Ludwig Gutmann.
By his Attorney
Edward P. Thompson (No Model.) 2 Sheets—Sheet 2.

L. GUTMANN.
ALTERNATING ELECTRIC MOTOR.

No. 530,177. Patented Dec. 4, 1894.

Witnesses:

Inventor:
Ludwig Gutmann.
By his Attorney
Edward P. Thompson

UNITED STATES PATENT OFFICE.

LUDWIG GUTMANN, OF PITTSBURG, PENNSYLVANIA.

ALTERNATING ELECTRIC MOTOR.

SPECIFICATION forming part of Letters Patent No. 530,177, dated December 4, 1894.

Application filed December 23, 1891. Serial No. 415,975. (No model.)

*To all whom it may concern:*

Be it known that I, LUDWIG GUTMANN, a subject of the Emperor of Germany, and a resident of Pittsburg, in the county of Allegheny and State of Pennsylvania, have invented a certain new and useful Improvement in Alternating Electric Motors, (Case No. 57,) of which the following is a specification.

My invention relates to alternating current electric motors, and its object is to provide a self-starting alternating current motor for heavy work which may be connected to and operated on existing single phase alternating current distributing circuits.

The motor is started as a series, shunt or induction motor by producing at the point of distribution rotation of a conductor in a field of variable intensity, caused or induced by a single phase alternating current, rotation being maintained by creating locally a bi-phase or polyphase system of currents with consequent rotating magnetic field and reacting upon the same with a field of alternating or constant polarity. In short, the motor is a self-starting synchronous motor which may possess a multiple number of harmonious speeds according to the particular construction.

Figure 3:
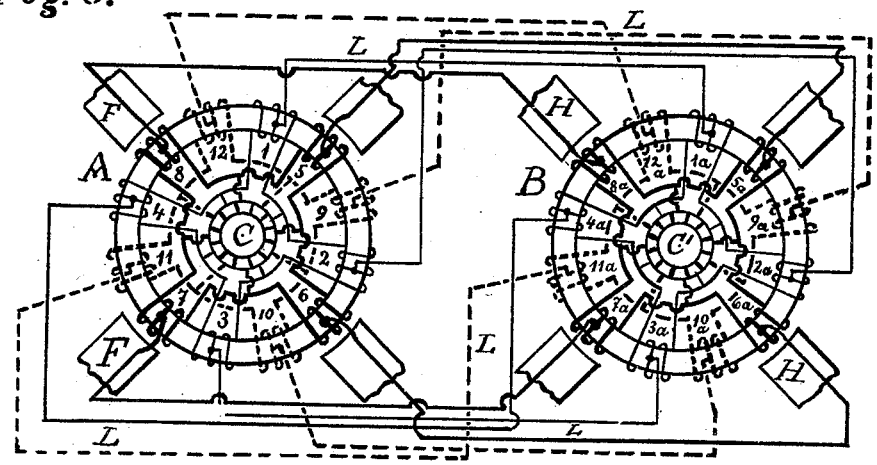
Figure 4:
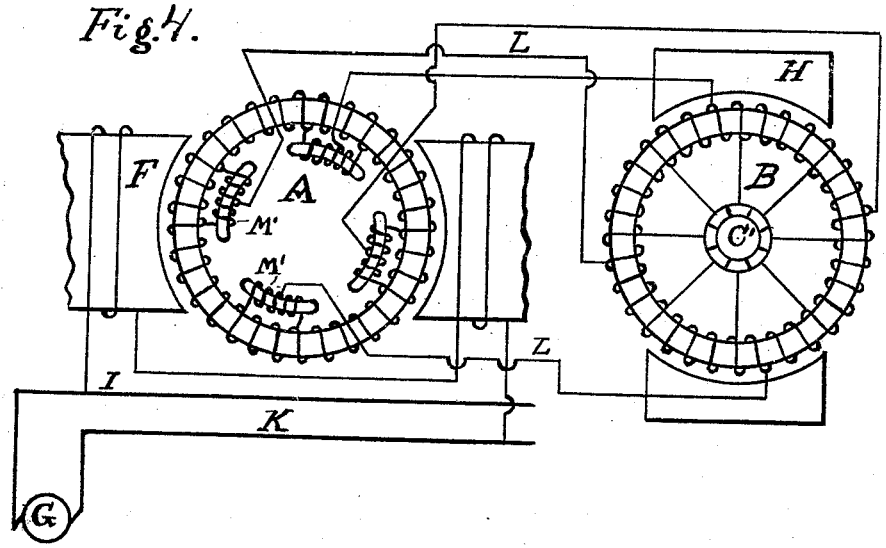

Referring to the drawings Figure 1 represents diagrammatically a motor embodying my invention, the main armature winding and the main field coils being connected in series relation. Fig. 2 illustrates my invention as applied to an inductor motor. Fig. 3 is illustrative of a motor provided with a number of separate armature windings. Fig. 4 illustrates a modified form of my invention.

Like letters and numerals refer to like parts in the several figures.

Referring to Fig. 1 the diagram represents a motor whose field magnet is constructed in two parts, the main field magnets F being energized by an alternating current derived from a source of single phase alternating currents, indicated by the collector rings G, the field coils being connected in series relation with the main armature winding A. The armature winding A comprises eight coils wound in closed circuit and connected in multiple with the coils of a supplemental winding B, located in the magnetic field of the field magnets H.

A commutator C is provided for the main armature winding, upon which rest brushes D D situated ninety degrees apart, which convey current to said main winding and the field coils of the magnets F.

A commutator C' is provided for the supplemental winding, brushes D' D' bearing thereon and conveying current to the coils of the field magnets H.

Referring to the armature the diagram shows that the main and supplemental windings are each provided with a set of coils marked 1, 2, 3, 4, 5, 6, 7, 8. Each set of eight coils forms a closed armature winding in itself. The connection of the eight coils of the main winding to those of the supplemental winding is effected by permanent connections L extending between the coils of the two windings. The combination therefore would be a closed circuited main winding A provided with closed sub-circuits through the supplemental winding B.

This motor will start in any position from a state of rest, and this start is caused by the main armature winding, which will send current pulsations into the supplemental winding and create therein bi-phase alternating currents. As the main winding has twice as many coils as there are field poles, the coils of the main winding will alternately send currents into the supplemental winding, establishing a two phase system in the latter. The motor will thus pick up in speed until, by means of the bi-phase currents in the supplemental winding and the reaction thereof on the preferably unexcited field H, it shall have reached its normal velocity, whereupon the brushes D' may be applied to commutator C' to energize the field winding of magnet H by commutated currents. It will thus be seen that the principle underlying the motor is that of first starting an armature in an alternating or pulsatory field and then establishing bi-phase or polyphase currents to produce a rotary field, and then reacting on this field by a magnetic field. Instead of connecting the field coils of magnet F in series with the armature coils, they may be connected in shunt relation therewith.

In Fig. 2 the motor is shown as an induction motor, the main field coils being excited by the single phase alternating current, but for clearness the field coils and the magnets have been omitted from the drawings, as have likewise the supplemental field magnets and coils.

Both the main and supplemental windings are divided into eight coils, but the coils of the supplemental winding instead of being in parallel connection with those of the main winding are connected in series therewith. Thus the right hand end of coil 1 of the main winding is connected to the beginning of coil 1 of the supplemental winding, the end of this coil being connected to the beginning of coil 2 of the main winding, the end of this coil being connected to the beginning of coil 2 of the supplemental winding, and so on, the coils being closed upon themselves by connecting the end of coil 8 of the supplemental winding to the beginning of coil 1 of the main winding. The eight coils of the main winding are shown connected to a four-part commutator, and those of the supplemental winding to one having eight segments. To the commutator C are applied two short-circuiting brushes which have no connection with the source, the motor thus belonging to the induction type. The brushes D' serve, as in Fig. 1, to supply a commutated current to the field magnets H.

In Fig. 3 the armature winding is shown to consist of three separate conductors, each being sub-divided, and constituting a closed circuited winding. The number of field poles of magnets F and H are shown equal, while the main and supplemental windings A and B are divided into three separate groups, the first group being numbered 1, $1^a$; 2, $2^a$; 3, $3^a$; 4, $4^a$; the second, 5, $5^a$; 6, $6^a$; 7, $7^a$; 8, $8^a$; and the third, 9, $9^a$; 10, $10^a$; 11, $11^a$; 12, $12^a$. The main armature coils may be connected to the supplemental armature coils, either in series or in parallel relation, the two sets of coils being shown connected in parallel. Both windings are provided with commutators C C', the segments of each of which are arranged in one circle.

The armature of Fig. 3 differs from the armature of Fig. 1, in that there are three windings of the kind of which Fig. 1 has but one, the windings being independent of one another. In this construction each winding should preferably be composed of coils having similar positions in the magnetic field, as indicated by the numbers. The coils of the first group are placed ninety degrees apart and have symmetrical positions with regard to the four field poles. The connections of the other two groups of coils, viz., 5, 6, 7, 8 and 9, 10, 11, 12, are likewise symmetrically disposed, and for the sake of clearness the three groups of coils are represented differently, the first group being indicated by fine lines, the second group by heavy lines, and the third group by heavy dotted lines. The position of each group of coils is indicated by the numbers, each group being normally displaced from its neighbor by thirty degrees.

The three windings are independent of one another inasmuch as they are not permanently connected together, although they are temporarily connected with one another through the brushes applied to the commutators.

The permanent connections between the coils of the main and supplemental windings are shown as located at the middle of the coils, but it is evident that any other point within the whole length of the coils may be selected for the permanent connection without departing from the nature of the invention.

The field magnets F are excited by the single phase alternating current, the coils being omitted for the sake of clearness, while the main armature winding may be connected therewith either in series, in shunt, or the armature may be in inductive relation to the field. The field magnets H may be excited by the commutated current collected from the commutator C'. The armature starts from rest in consequence of the reaction between the magnet F and the main winding, which latter sends current impulses to the supplemental winding, enabling the same to react on field magnet H and cause the armature to pick up in speed, whereby the current impulses sent to the supplemental winding become the more regular and the torque of the motor becomes the greater the nearer the armature speed approaches synchronism.

This machine has the property of rotating synchronously at three speeds, because the armature has three symmetrical windings. If one set changes its position and reaches within half a period the same position before the next pole that it had occupied before the pole it has just left, we then have one synchronous speed. If the three groups of coils are acting alternately and reach in rotation successive field poles, the next slower synchronous speed is obtained—that is, if group 1 has a given position in the magnetic field and at the end of one half period group 2 takes a similar position, but in front of the pole next in rotation, and on the next half period the third group of coils takes a similar position in front of the next pole in the direction of rotation, that is ahead of the position occupied by group 2, this slower synchronous speed exists. Finally, if all three interchange positions with one another, and periodically and successively carry maximum current, but rest in front of the same field pole instead of successive ones, the third and slowest speed exists—that is, if group 1 has a given position in the magnetic field and at the end of a half period group 3 takes the position just held by group 1 in front of this same pole, and on the next half period the second group occupies this identical position, and again at the next half period the first group occupies this position, then the third and slowest synchronous speed is obtained. The number of field poles and the number of closed armature circuits or conductor systems determine the variable number of synchronous speeds. If the field magnet H is energized by an alternating current the armature is capable of changing more readily from one synchronous speed to another than if the field polarity were constant. It will therefore be evident that if magnet H is energized by a continuous or commutated current the greatest possible stability between the field and the synchronously rotating armature is obtained.

Fig. 4 shows a further modification. In this construction the permanent connections between the coils of the main and supplemental windings are shown joined to the coils of the supplemental winding at non-central points. There are in the main winding four permanent short or closed circuits caused by the devices M', which may be coils wound about magnetic cores rotating with the winding. From these coils connections are made by conductors L to four points in the supplemental winding B. The supplemental field magnets H may be excited by the commutated current collected from commutator C', the coils being omitted for clearness.

The construction shown in this application, it will be noticed, gives a self-starting synchronous or harmonic motor which has all of the properties of a bi-phase or polyphase machine, and which, when pulled out of step by heavy load, will continue to run at a slower harmonic speed; that is to say, if the alternations are twelve thousand per minute and the field has four poles, then synchronism would require the armature to rotate at three thousand revolutions. If the armature contains three closed circuits it would run at three thousand in synchronism, or harmonic at two thousand or one thousand. This will be clear by reference to Fig. 3, in which the armature being symmetrical it will be indifferent which of the closed coils reaches the position which would insure continuous rotation in one direction; or, by referring to Fig. 4, it will be seen that the closed circuited coils are in proper position for rotation in clock-wise direction, and if synchronism exists one set of closed circuits would always be acted upon by the field poles as if the others did not exist; but when, due to a heavy load, the armature is prevented from rotating so fast, and instead of making a half revolution makes but a quarter revolution, the two sets of closed circuited coils would alternate in the work harmoniously, whereby the speed would be reduced to one-half. The greater the number of closed circuited coils, the smaller is the rate of change from one harmonious speed to another, but at the same time the greater is the range of speed through which the motor may be operated without falling out of step. If the load is increased to such an extent that the lowest harmonic speed can no longer be obtained, the motor will stop like any other synchronous motor.

It is evident that all armature types shown, whether for a series, shunt or induction motor, may be used with any desirable number of poles or regions of maximum magnetic flux; also that either a Gramme or drum winding may be used, and that instead of two or three phase currents, as described, twenty or thirty or more phases may be created.

It is evident that my invention is susceptible of modifications, and I do not, therefore, desire to limit myself to details, but, Having described my invention, what I claim as new, and desire to secure by Letters Patent, is—

1. The method of transforming electrical into mechanical energy, which consists in bringing the rotatable element of a motor to the critical speed through the influence of a uniphase alternating current applied to one or both of the motor elements, and then maintain the rotation by producing in said movable element currents of displaced phase, and subjecting the conductors carrying said displaced currents to the influence of a magnetic field, substantially as described.

2. The method of transforming electrical into mechanical energy which consists in bringing the rotatable element of a motor to the critical speed through the influence of a uniphase alternating current applied to one or both of the motor elements, establishing currents in a main armature winding, passing said currents periodically and successively through a supplemental winding to produce therein a rotating field, and subjecting said supplemental winding to the influence of a magnetic field, substantially as described.

3. The herein described method of maintaining the rotation of the movable element of a motor under load, which consists in establishing in one of the motor elements, alternating currents, splitting said alternating currents, sending said split currents periodically through sub-circuits to establish in said element a biphase or polyphase system of currents, and reacting upon the conductors carrying said biphase or polyphase currents with a magnetic field of constant polarity, substantially as described.

4. The method of transforming electrical into mechanical energy, which consists in subjecting the stationary and rotary elements of a motor to the influence of a uniphase alternating current, establishing in a supplemental winding bi-phase or polyphase currents, and subjecting said supplemental winding to the influence of a magnetic field, substantially as described.

5. The method of transforming electrical into mechanical energy, which consists in subjecting the stationary and rotary elements of a motor to the influence of a uniphase alternating current, establishing in a supplemental winding bi-phase or polyphase currents, and subjecting said supplemental winding to the influence of a magnetic field of constant polarity, substantially as described.

6. The combination with a source of single phase alternating currents, of a main armature winding adapted to be rotated through the influence of the current from said source, a supplemental armature winding, the coils thereof being connected in circuit with said main winding through which coils currents from said main winding are adapted to be successively and periodically passed to produce biphase or polyphase currents, a commutator for commutating said biphase or polyphase currents, a field magnet adapted to react upon the conductors carrying said biphase or polyphase currents, and coils for exciting said field magnet, said coils being included in circuit with said commutator, substantially as described.

In testimony that I claim the foregoing as my invention I have signed my name, in presence of two witnesses, this 9th day of December, 1891.

LUDWIG GUTMANN.

Witnesses:
CECIL P. POOLE,
W. M. LILE.